United States Patent
Burdett

[15] 3,675,965
[45] July 11, 1972

[54] FOLDING BED ASSEMBLY FOR A VEHICLE

[72] Inventor: Roy Burdett, 3818 E. Fourth Street, Long Beach, Calif. 90814

[22] Filed: July 13, 1970

[21] Appl. No.: 54,327

[52] U.S. Cl. ...................................... 296/23, 108/48, 5/2
[51] Int. Cl. ................................................ B60p 3/36
[58] Field of Search ................... 108/48; 5/118, 2; 296/23

[56] References Cited

UNITED STATES PATENTS

| | | | |
|---|---|---|---|
| 3,353,861 | 11/1967 | Froitzheim | 5/118 |
| 1,990,959 | 2/1935 | Saperstein | 5/2 |
| 1,849,184 | 3/1932 | Gay | 108/48 |
| 3,242,882 | 3/1966 | Hoyt | 108/48 |

Primary Examiner—Philip Goodman
Attorney—Kolisch & Hartwell

[57] ABSTRACT

A bed assembly for a vehicle having an upright sidewall. The assembly includes a pair of rectangular frames hinged together along a pair of adjacent side edges. One frame is hinged to the sidewall of the vehicle for swinging between an open horizontal position, and a stored position adjacent the wall. The other frame is swingable between a stored position folded back against the bottom side of the one frame and an open horizontal position. Legs pivotally connected to the frames support them above the floor of the vehicle. Linking arms connected to the legs swing them to positions normal to the frames on swinging of the frames to their horizontal positions.

3 Claims, 4 Drawing Figures

PATENTED JUL 11 1972 3,675,965

INVENTOR.
ROY BURDETT
BY Kolisch & Hartwell

ATTORNEYS

FOLDING BED ASSEMBLY FOR A VEHICLE

This invention relates to a folding bed assembly for a vehicle.

A general object of the invention is to provide a novel folding bed assembly which may be stored compactly against a sidewall in a vehicle, and which is openable to provide a bed extending across the width of the vehicle.

Another object is to provide such a folding bed assembly which is simply and easily shifted between its stored and its open positions.

Yet another object is to provide, in a vehicle, a bed assembly which includes a pair of hinge-connected frames which may be swung between stored and open positions, support legs pivotally connected to the frames, and linkage arms connected to the legs for moving the legs between stored and supporting positions.

These and other objects and advantages will become more fully apparent as the following description is read in conjunction with the drawings, wherein.

Figure 1:
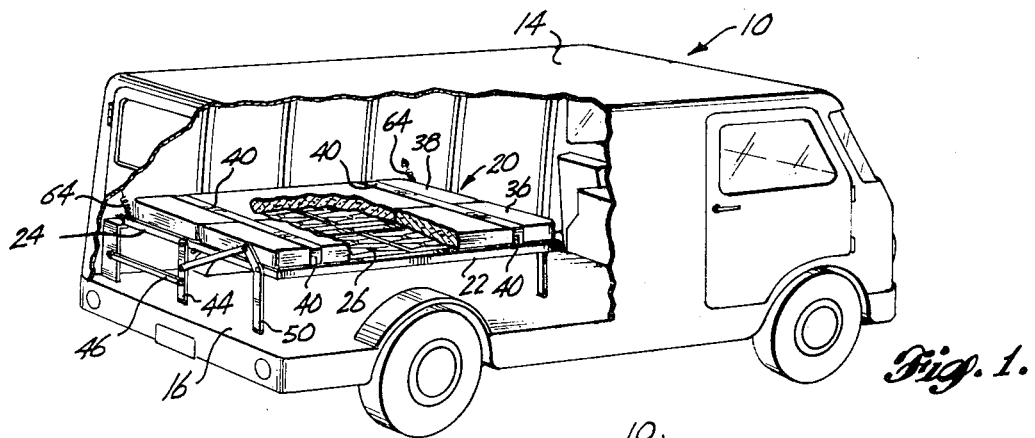
FIG. 1 is a perspective view of a van-type vehicle, with portions broken away, in which is mounted a folding bed assembly according to the invention.

Referring now to the drawings, at 10 is indicated generally a van-type vehicle, or truck, having sidewalls, such as the one indicated generally at 12, a roof 14, and floor 16. These enclose a compartment in the rear of the vehicle.

Figure 2:
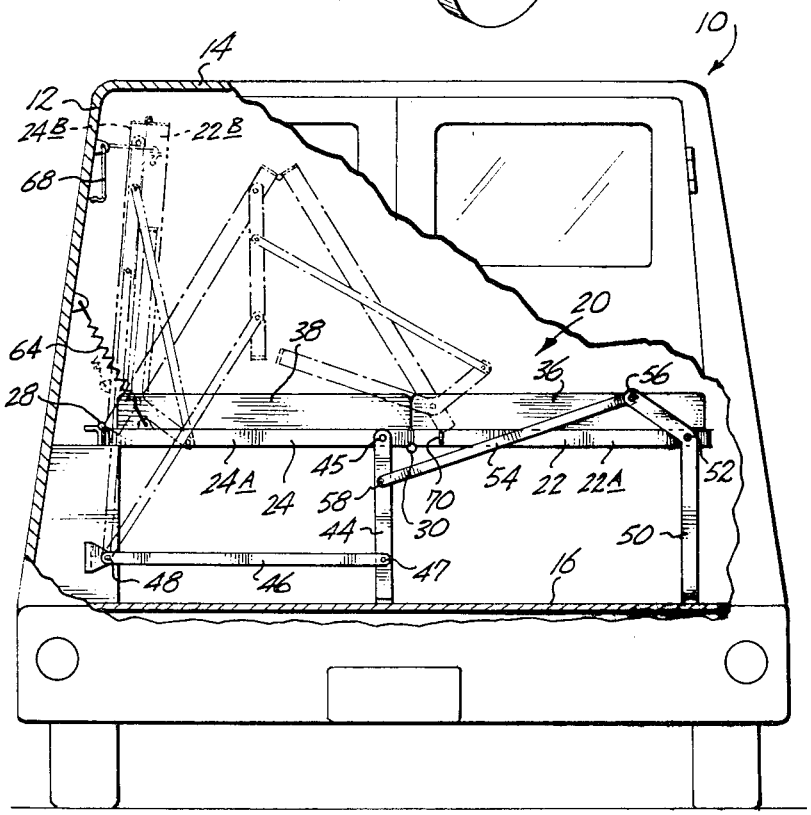
FIG. 2 is an enlarged rear end view of the vehicle and folding bed assembly of FIG. 1 with portions of the vehicle broken away and with the bed assembly shown in various positions.

Mounted in this compartment is a folding bed assembly 20. Referring to FIGS. 1 and 2, the bed includes a pair of rectangular frames 22, 24. The frames may be constructed of elongated angle iron members joined, as by welding, adjacent their ends. Spanning each frame is a spring structure, such as that represented at 26.

Hinges, such as the one shown at 28, hingedly connect a side edge of frame 24 to vehicle sidewall 12. The hinges provide a horizontal hinge axis for frame 24 extending lengthwise of the truck. The frame is swingable between an open horizontal position (as illustrated in solid outline at 24A), and a stored upright position (as shown at 24B in FIGS. 2 and 3).

Frames 22, 24 are hingedly connected to each other along adjacent side edges, by hinges, such as the one indicated generally at 30. These permit relative swinging of the frames about an axis extending lengthwise of the truck, paralleling the axis of hinges 28. Frame 22 is swingable between what is referred to herein as an open horizontal position, (shown at 22A), where it extends outwardly from the edge of frame 24 and a stored position where it is folded back to lie alongside frame 24. Frame 22 is shown in its stored position at 22B in FIGS. 2 and 3.

Mattresses 36, 38 are shown supported on what may be referred to as the supportive sides of frames 22, 24, respectively. Fabric straps 40 extend over the mattresses and serve to hold the mattresses on the frames.

With the mattresses thus retained on the frames, when the frames are in their horizontal positions, the mattresses form a substantially continuous support surface. When frame 24 is swung to its upright stored position, with frame 22 folded back against it, mattress 38 is held against sidewall 12 of the truck, and mattress 36 faces inwardly toward the center of the truck.

A leg 44 is pivotally connected at 45 to the near end of frame 24 in FIG. 2, adjacent the right side edge of the frame. This leg is swingable about a substantially horizontal axis extending longitudinally of the truck. One end of an elongated rigid arm 46 is pivotally connected at 47 to a lower portion of leg 44. The opposite end of arm 46 is pivotally connected at 48, to the wall of the truck.

Another elongated leg 50 is pivotally connected intermediate its ends, at 52, to the end of frame 22, adjacent its right side edge as seen in FIG. 2. One end of an elongated rigid arm 54 is pivotally connected at 56 to the upper end of leg 50. The opposite end of arm 54 is pivotally connected at 58, to leg 44, at a point located between its pivot connection 45 with frame 24 and its pivot connection 47 with arm 46. The various pivot connections provide for pivotal movement about axes paralleling the axis of hinge 28.

Legs similar to legs 44, 50, and arms similar to arms 46, 54 are similarly connected at the opposite ends of the frames. These are obscured from view in the drawings. The various legs constitute support means for the mattress frames, and the various arms constitute linkage means producing swinging movement of the arms.

A pair of tension springs, such as the one indicated at 64, in FIG. 2, are connected at one set of their ends to sidewall 12 of the truck. The other set of ends of the springs are connected to opposite ends of frame 24. Springs 64 urge frame 24 to swing in a counterclockwise direction as viewed in FIG. 2, whereby frame 24 is moved upwardly toward its stored position. These springs should not have sufficient tension to swing frame 24 upwardly without a manual assist by a person folding up the bed.

Figure 3:
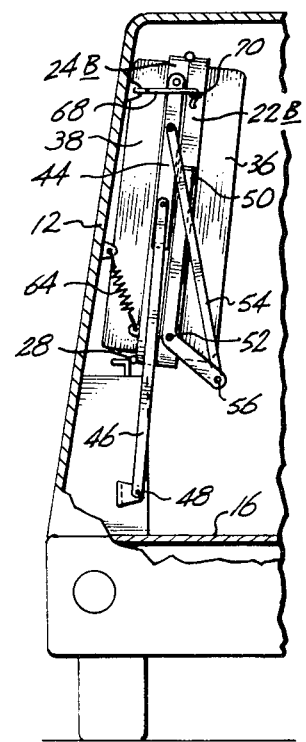
FIG. 3 is an end view of portions of the vehicle, showing the bed assembly in a stored position.

A hook 68 is swingably connected to sidewall 12 of the truck, and is adapted to engage an eyebolt 70 secured to frame 22 (see FIG. 3). The hook and eyebolt serve to support the folding bed assembly against the sidewall when the frames are in their stored positions.

Explaining briefly the operation of the apparatus, the frames and mattresses when supported in their open, or horizontal, positions by legs 44, 50 form a bed which extends substantially across the width of the compartment in the vehicle. To place the bed assembly in a stored position against the sidewall (thus to free the compartment for other uses), an operator merely swings frames 22, 24, and their associated mattresses, toward sidewall 12, with the assistance of springs 64. Frame 24 swings in a counterclockwise direction about the axis provided by hinges 28, and frame 22 swings in a clockwise direction about the axis provided by hinge 30. During such movement of the frames, arm 46 operates to swing leg 44 from a position normal to frame 24 to a position extending alongside an end of frame 24. Furthermore, arm 54 swings leg 50 from a position normal to frame 22 to a position extending alongside the end of the frame. Hook 68 may then be engaged with eyebolt 70 to secure the bed assembly in a stored position against the sidewall. With the bed assembly in its stored position, mattress 38 is firmly held against the sidewall to prevent the metal frame of the bed from contacting the sidewall, and mattress 36 faces the center of the compartment to provide padding for objects in the compartment. This procedure is reversed to bring the bed assembly from its stored position to its open position to form a bed.

Figure 4:
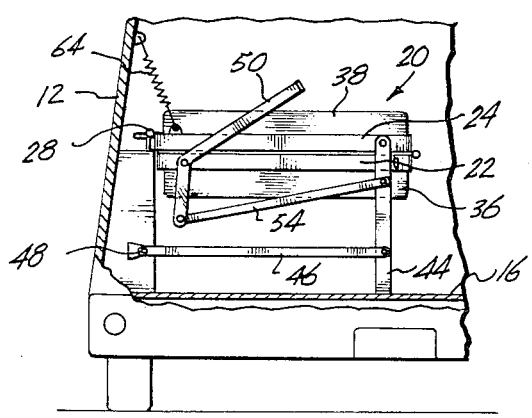
FIG. 4 is a view, on a slightly smaller scale, showing the bed assembly in another position.

To place the bed assembly in the position shown in FIG. 4, forming a sofa or half bed, frame 24 may be swung in a clockwise direction about its hinge connection 28, from its stored to its horizontal position. Frame 24 may be maintained against the backside of frame 24, thus finally to assume a position under frame 24.

With the construction described, a folding bed assembly is provided for a vehicle which may be stored compactly against the sidewall, yet which is easily folded out to form either a full or a half bed. The linkage means connected to the support legs causes the legs to swing automatically to support positions on the frames being swung to their open positions, and causes the legs to swing to stored positions on the frames being swung to their respective stored positions.

While an embodiment of the invention has been described herein, it should be obvious to those skilled in the art that variations and modifications are possible without departing from the spirit of the invention.

It is claimed and desired to secure by Letters Patent:

1. In a vehicle having an upright sidewall, a folding bed assembly comprising a first substantially rectangular frame hingedly connected at one of its side edges to such sidewall for swinging movement between an open position where a supportive side of the frame faces upwardly and is substantially horizontal and a stored upright position in which said supportive side of the frame faces the sidewall, a second frame hingedly connected at one of its side edges to a side edge of said first frame opposite the latter's said one side edge, for swinging between an open position where a supportive side of the second frame faces upwardly and is substantially horizontal and a stored position in which it is folded back against the side of the first frame opposite the latter's said supportive side, with the supportive side of the second frame facing away from the sidewall, and support means connected to said first and second frames adapted to support said frames above the floor of such vehicle in each of said positions.

2. The folding bed assembly of claim 1, wherein said support means comprises a leg pivotally connected to said second frame adjacent a side edge of said second frame opposite its said one side edge, and said assembly further comprises linkage means connected to said leg operable to swing the leg between a stored position extending alongside said second frame in a direction extending away from said opposite side edge of the frame and a support position extending normal to said second frame.

3. In a vehicle having an upright sidewall, a folding bed assembly comprising a first substantially rectangular frame hingedly connected at one of its side edges to such sidewall for swinging movement between an open position where it is substantially horizontal and a stored upright position in which one side of the frame faces the sidewall, a second frame hingedly connected at one of its side edges to a side edge of said first frame opposite the latter's said one side edge, for swinging between an open position where it is substantially horizontal and a stored position in which it is folded back against the side of the first frame opposite the latter's said one side, a first leg pivotally connected to said first frame adjacent its said opposite side edge, first linkage means connected to said first leg operable to swing the leg between a stored position where the leg extends alongside said first frame and a support position where the leg extends normal to the first frame, a second leg pivotally connected to said second frame adjacent the side edge of said second frame opposite its said one side edge, for swinging between a stored position extending alongside the second frame and a support position extending normal to the second frame, and second linkage means operatively interconnecting the first leg and the second leg whereby the second leg swings from its stored to its support position on the first leg swinging from its stored to its support position.

* * * * *